United States Patent
Liu et al.

(10) Patent No.: US 8,699,858 B2
(45) Date of Patent: Apr. 15, 2014

(54) COMBINED VISUAL AND AUDITORY PROCESSING

(75) Inventors: Ce Liu, Cambridge, MA (US); Sylvain Paris, Boston, MA (US); Paris Smaragdis, Brookline, MA (US); Wojciech Matusik, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1113 days.

(21) Appl. No.: 12/323,738

(22) Filed: Nov. 26, 2008

(65) Prior Publication Data

US 2010/0054694 A1 Mar. 4, 2010

Related U.S. Application Data

(60) Provisional application No. 61/093,207, filed on Aug. 29, 2008.

(51) Int. Cl.
| | |
|---|---|
| *H04N 5/93* | (2006.01) |
| *G11B 27/00* | (2006.01) |
| *G11B 27/031* | (2006.01) |
| *G06T 7/00* | (2006.01) |
| *H04N 5/222* | (2006.01) |

(52) U.S. Cl.
CPC .............. *G11B 27/031* (2013.01); *G11B 27/00* (2013.01); *H04N 5/2226* (2013.01); *G06T 7/0087* (2013.01)
USPC ............................ 386/285; 386/226; 382/164

(58) Field of Classification Search
CPC ................ G06T 7/0081; G06T 7/0087; G06T 2207/10024; G06T 2007/20144; G11B 27/00
USPC ................................... 386/226, 285; 382/164
See application file for complete search history.

(56) References Cited

U.S. PATENT DOCUMENTS

| | | | |
|---|---|---|---|
| 6,724,915 B1 * | 4/2004 | Toklu et al. .................... | 382/103 |
| 2004/0042662 A1 * | 3/2004 | Wilensky et al. ............. | 382/194 |
| 2007/0183661 A1 * | 8/2007 | El-Maleh et al. ............. | 382/173 |
| 2007/0186235 A1 * | 8/2007 | Jarman et al. .................... | 725/28 |
| 2008/0019587 A1 * | 1/2008 | Wilensky et al. ............. | 382/159 |
| 2008/0181457 A1 * | 7/2008 | Chattopadhyay et al. ..... | 382/103 |
| 2008/0183751 A1 * | 7/2008 | Cazier et al. ................ | 707/104.1 |

FOREIGN PATENT DOCUMENTS

| | | | | | |
|---|---|---|---|---|---|
| AU | 9965331 | * | 7/2000 | ............. | H04N 5/262 |
| JP | 2004147205 | * | 5/2004 | ............... | H04N 5/91 |
| JP | 2004147205 A | * | 5/2004 | ............... | H04N 5/91 |

* cited by examiner

*Primary Examiner* — Thai Tran
*Assistant Examiner* — Girumsew Wendmagegn
(74) *Attorney, Agent, or Firm* — Wolfe-SBMC

(57) ABSTRACT

A computer-implemented method includes segmenting a plurality of video frames of a sequence of video frames into a first portion that includes a selected visual object represented in the video frame and a second portion that includes a background represented in the video frame. The selected visual object is selected by using a selection envelope.

46 Claims, 10 Drawing Sheets

COMBINED VISUAL AND AUDITORY PROCESSING

CROSS REFERENCE TO RELATED APPLICATIONS

This U.S. patent application claims priority under 35 U.S.C. §119(e) to U.S. Provisional Application 61/093,207, filed on Aug. 29, 2008. The disclosure of this prior application is considered part of the disclosure of this application and is incorporated herein by reference in its entirety.

BACKGROUND

The present disclosure relates to processing visual and audio components of video sequences.

Collected video sequences may contain a variety of content. For example, both visual and auditory information of an object (e.g., a person, such as an actor, a musical instrument, a vehicle) may be represented and mixed with visual and auditory information associated with other objects (e.g., a set, which can include furniture and other props, scenery, such as trees or buildings). Visual information and audio information are typically processed separately.

SUMMARY

The specification describes a method of interactive video editing.

In general, one aspect of the subject matter described in this specification can be embodied in a computer-implemented method that includes segmenting a plurality of video frames of a sequence of video frames into a first portion that includes a selected visual object represented in the video frame and a second portion that includes a background represented in the video frame, in which the selected visual object is selected by using a selection envelope. Other implementations of this aspect include corresponding systems and computer program products.

These and other implementations can optionally include one or more of the following features. The method may further include adding a third portion that corresponds to an additional selected visual object. The method may further include editing pixels identified as part of the first portion that includes the selected visual object. The method may further include estimating a mean and a covariance of at least one pixel that is identified as being absent from the first portion that includes the selected visual object; computing a probability distribution from the estimated mean and covariance; applying a threshold to each pixel associated with the probability distribution and classifying the pixel as foreground or background; forming a first color histogram for foreground pixels and a second color histogram for background pixels; and minimizing an objective function. The objective function may include at least one of a spatial prior term, a color likelihood term, and a continuity term.

In general, another aspect of the subject matter described in this specification can be embodied in a computer-implemented method that includes segmenting a plurality of video frames of a sequence of video frames into a first portion that includes a selected visual object represented in the video frame and a second portion that includes a background represented in the video frame, in which the selected visual object is selected by using a selection envelope. The method also includes linking the first portion that includes a selected visual object with an audio object included in the sequence of video frames.

These and other implementations can optionally include one or more of the following features. The method may include adding a third portion that corresponds to an additional selected visual object; and linking the third portion with an additional audio object. The method may further include editing pixels identified as part of the first portion that includes the selected visual object. The method may further include separating audio information into a plurality of channels. The method may further include estimating a mean and a covariance of at least one pixel that is identified as being absent from the first portion that includes the selected visual object; computing a probability distribution from the estimated mean and covariance; applying a threshold to each pixel associated with the probability distribution and classifying the pixel as foreground or background; forming a first color histogram for foreground pixels and a second color histogram for background pixels; and minimizing an objective function. The method can further include editing a property of the selected visual object based on the linked audio object. The property of the selected visual object may include at least one of size, color, motion, or number. The method may further include editing a property of the audio object based on the linked first visual object. The property of the audio object may include at least one of volume, frequency, or timing. The method may further include editing the video sequence to remove the first portion that includes a selected visual object of interest and the linked audio object.

In general, another aspect of the subject matter described in this specification can be embodied in a system that includes a computing device including a video manager for segmenting a plurality of video frames of a sequence of video frames into a first portion that includes a selected visual object represented in the video frame and a second portion that includes a background represented in the video frame, in which the selected visual object is selected by using a selection envelope.

These and other implementations can optionally include one or more of the following features. The video manager may be configured to add a third portion that corresponds to an additional selected visual object. The video manager may also be configured to edit pixels identified as part of the first portion that includes the selected visual object. The video manager may be configured to estimate a mean and a covariance of at least one pixel that is identified as being absent from the first portion that includes the selected visual object; compute a probability distribution from the estimated mean and covariance; apply a threshold to each pixel associated with the probability distribution and classifying the pixel as foreground or background; form a first color histogram for foreground pixels and a second color histogram for background pixels; and minimize an objective function. The objective function may include at least one of a spatial prior term, a color likelihood term, and a continuity term.

In general, another aspect of the subject matter described in this specification can be embodied in a system that includes a computing device including a video manager for segmenting a plurality of video frames of a sequence of video frames into a first portion that includes a selected visual object represented in the video frame and a second portion that includes a background represented in the video frame, in which the selected visual object is selected by using a selection envelope. The computing device also includes a linking manager for linking the first portion that includes a selected visual object to at least one audio object.

These and other implementations can optionally include one or more of the following features. The video manager may be configured to add a third portion that corresponds to an additional selected visual object; and the linking manager may be configured to link the third portion with an additional audio object. The video manager may be configured to edit pixels identified as part of the first portion that includes the selected visual object. The computing device may also include an audio manager for separating at least one audio object in the video sequence into a plurality of channels. The video manager may be configured to estimate a mean and a covariance for all pixels that are excluded from a shape; compute a probability distribution for all pixels having an estimated mean and covariance; apply a threshold to each pixel associated with the probability distribution and classifying the pixel as foreground or background; form a first color histogram for foreground pixels and a second color histogram for background pixels; and minimize an objective function. The video manager may be configured to edit a property of the first visual object based on the linked audio object. The property of the first visual object may include at least one of size, color, motion, or number. The video manager may be configured to edit a property of the audio object based on the linked first visual object. The property of the audio object may include at least one of volume, frequency, or timing. The video manager may further be configured to edit the video sequence to remove the first portion that includes a first visual object of interest and the linked audio object.

In general, another aspect of the subject matter described in this specification can be embodied in a computer program product, encoded on a computer-readable medium, operable to cause data processing apparatus to perform operations that include segmenting a plurality of video frames of a sequence of video frames into a first portion that includes a selected visual object represented in the video frame and a second portion that includes a background represented in the video frame, in which the selected visual object is selected by using a selection envelope.

These and other implementations can optionally include one or more of the following features. Operations may include adding a third portion that corresponds to an additional selected visual object. Operations may further include editing pixels segmented as part of the selected visual object. Operations may further include estimating a mean and a covariance of at least one pixel that is identified as being absent from the first portion that includes the selected visual object; computing a probability distribution from the estimated mean and covariance; applying a threshold to each pixel associated with the probability distribution and classifying the pixel as foreground or background; forming a first color histogram for foreground pixels and a second color histogram for background pixels; and minimizing an objective function. The objective function may include at least one of a spatial prior term, a color likelihood term, and a continuity term.

In general, another aspect of the subject matter described in this specification can be embodied in a computer program product, encoded on a computer-readable medium, operable to cause data processing apparatus to perform operations that include segmenting a plurality of video frames of a sequence of video frames into a first portion that includes a selected visual object represented in the video frame and a second portion that includes a background represented in the video frame, in which the selected visual object is selected by using a selection envelope. Operations also include linking the first portion that includes a selected visual object with an audio object included in the sequence of video frames.

These and other implementations can optionally include one or more of the following features. Operations may further include adding a third portion that corresponds to an additional selected visual object; and linking the third portion with an additional audio object. Operations may further include editing pixels identified as part of the first portion that includes the selected visual object. Operations may further include separating audio information into a plurality of channels. Operations may further include estimating a mean and a covariance of at least one pixel that is identified as being absent from the first portion that includes the selected visual object; computing a probability distribution from the estimated mean and covariance; applying a threshold to each pixel associated with the probability distribution and classifying the pixel as foreground or background; forming a first color histogram for foreground pixels and a second color histogram for background pixels; and minimizing an objective function. Operations may further include editing a property of the selected visual object based on the linked audio object. The property of the selected visual object may include at least one of size, color, motion, or number. Operations may further include editing a property of the audio object based on the linked first visual object. The property of the audio object may include at least one of volume, frequency, or timing. Operations may further include editing the video sequence to remove the first portion that includes a selected visual object of interest and the linked audio object.

In general, one aspect of the subject matter described in this specification can be embodied in a computer-implemented method that includes executing instructions on a specific apparatus so that binary digital electronic signals representing a plurality of video frames of a sequence of video frames are segmented into binary digital electronic signals representing a first portion that includes a selected visual object represented in the video frame and a second portion that includes a background represented in the video frame, in which the selected visual object is selected by using a selection envelope. The method also includes storing the resulting binary digital electronic signals representing the first portion and the second portion in a location in memory of said specific apparatus for later use.

Particular implementations of the subject matter described in this specification can be implemented to realize one or more of the following advantages. Visual and audio processing techniques are described that may be used to improve the quality of video editing and rendering representations of the video.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
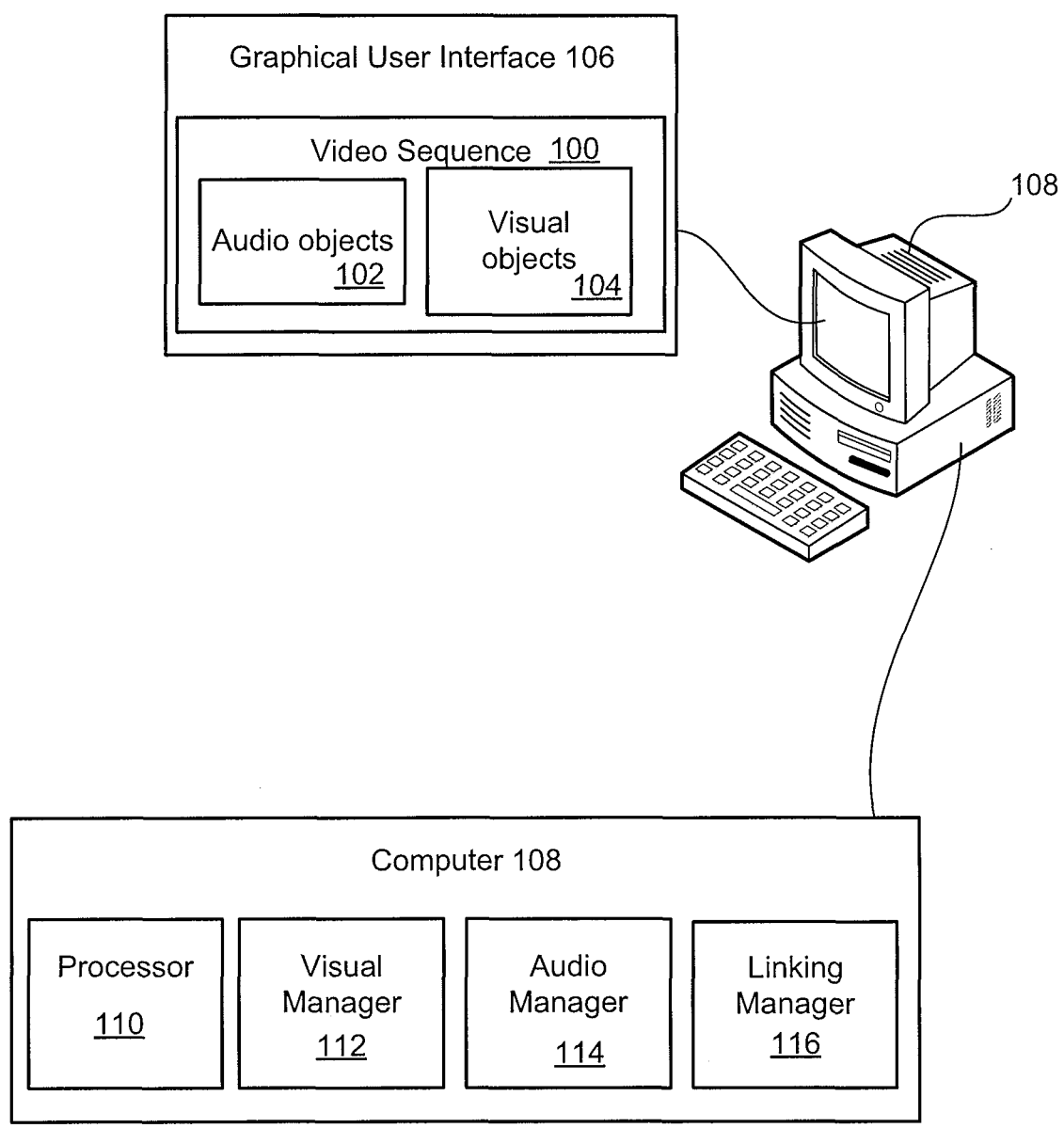
FIG. 1 is a schematic view of a video sequence displayed in a graphical user interface on a computer.

Referring to FIG. 1, a video sequence 100 contains both audio objects (e.g., sequences of sounds) 102 and visual objects (e.g., groups of pixels that represent a person, structure) 104. Techniques that combine visual information (e.g., pixels) and audio information (e.g., sound tracks) to analyze and to edit both the pixels and sound tracks of the objects in the video sequence permit (e.g., via special effects) the visual information (e.g., location or movement of a visual object) to control changes in the audio information (e.g., a volume, a frequency, a timing). Alternatively or in addition, audio information (e.g., a volume, a frequency, a timing) can be used to change an aspect of the visual information (e.g., a location or a movement of a visual object).

One difficulty of combining visual and auditory processing is extracting the visual and audio information from the video sequence. For example, the separation of the pixels (often referred to as object segmentation or foreground matting) or the separation of a sound track (referred to as signal separation) can be time consuming and processor intensive for computer systems.

Conventional computer vision and digital audio techniques present difficulties in producing satisfactory visual segmentations and audio separations and typically only focus on executing just one of the two processing techniques (either visual or audio processing). However, by combining the visual and audio processing, inherent associations between visual objects 104 and their corresponding audio objects 102 (e.g., an actor and his voice, a car and its horn) need not be ignored and can be used to enhance editing of the video sequence 100. A high-quality separation of audio information 102 and video information 104 can be efficiently provided by the system and techniques described in this application.

A graphical user interface (GUI) 106 can be displayed on a computer 108 and a user can edit a video sequence 100 by using the GUI. In addition to the GUI 106, other hardware and software associated with the computer 108 can be used for processing, for example, a general processor 110, a memory (not shown) (e.g., random access memory, read only memory, dynamic random access memory), along with other types of components. A visual manager 112, an audio manager 114, and a linking manager 116 are executed by the computer 108 and can each be, for example, stored in a memory (not shown).

In some examples, the visual manager 112 controls a visual GUI that allows a user to identify visual objects 102 of interest in multiple frames, which can be called "key frames," of a video sequence 100. The visual GUI can be part of the GUI 106. The visual manager 112 can then track the identified visual objects 102 through all frames of the video sequence 100 by, for example, interpolating the position of the objects between user-identified key frames. Alternatively or in addition, the visual manager 112 can also control additional processing of the identified visual objects 102. For example, the visual manager 112 can use statistical analyses to segment or classify pixels (i.e., picture elements) within the visual objects 102.

The audio manager 114 can control processing of the audio objects 104. For example, the audio manager can use statistical analyses to segment audio information for the video sequence 100 into multiple channels. The audio manager 114 can also control an audio GUI that allows a user to identify audio objects 104 of interest.

The linking manager 116 can control a process that associates an identified visual object 102 with a corresponding audio object 104. The linking manager 116 can receive user input (e.g., through the GUI 106) that identifies a visual object 102 as well as an audio object 104 and can associate the two objects and can facilitate editing of the video sequence 100 in a combined fashion.

Graphical User Interface for Visual Objects

Figure 2:
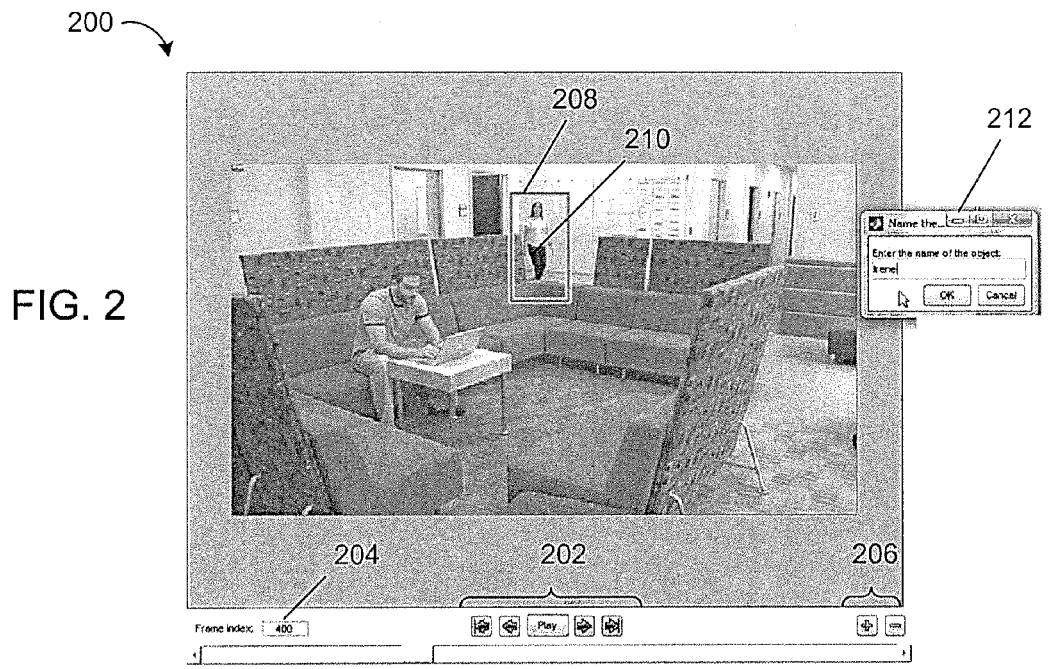
FIGS. 2-5 and FIG. 8 are representations of a visual graphical user interface.

Referring to FIG. 2, an exemplary visual GUI 200 permits a user to identify visual objects within a video sequence. The user can use controls 202, for example, a touch screen or a pointing device, such as a mouse, to select a video frame index 204 to identify a frame that includes the visual object of interest, and can use buttons 206 to add or delete a shape 208 (e.g., a bounding box) that can be placed around a visual object 210. The user can label the shape 208 using a menu 212 (for example, the user can assign a particular identifier to the visual object).

Figure 3:
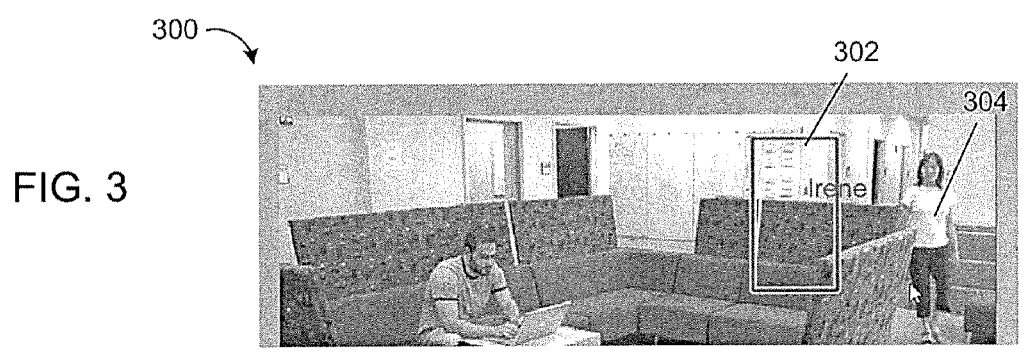
Figure 4:
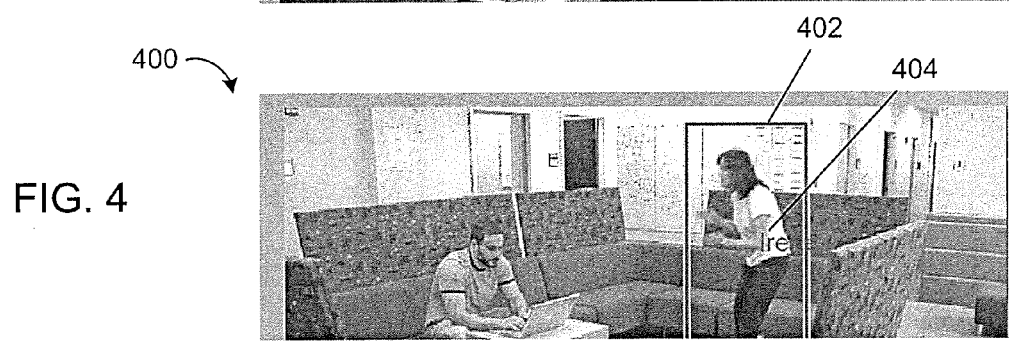

Referring to FIGS. 3 and 4, partial views of visual graphical user interfaces 300 and 400 are shown. For each of these views, the user has advanced the frame index 204 of the video sequence, and the visual object (304 in FIG. 3 and 404 in FIG. 4) has changed spatial positions. In FIG. 3, the shape 302 no longer surrounds the object 304, and the user can correct this by dragging the shape so that it contains the object in the object's new location.

Visual Processing

Once the visual objects of interest have been identified in selected key frames, the pixels within these objects may be segmented or classified as belonging to the "object group" or the "non-object group" or "background group." This segmentation can be performed in all frames of the video sequence and can help to interpolate the position of the visual object 102 between the selected key frames.

Two techniques that can be used to interactively segment a moving object from a background include rotoscoping (described, e.g., by Agarwala, A., et al., in "Keyframe-based tracking for rotoscoping and animation," ACM SIGGRAPH, 23(3):584-591, 2004; by Li, Y., et al., in "Video object cut and paste," ACM SIGGRAPH, 2005," and by Liu, C., et al., "Human-assisted motion annotation," CVPR, 2008) and scribbling (described, e.g., by Chuang, Y, et al., in "Video matting of complex scenes," ACM SIGGRAPH, 2002, and by Wang, J., et al., in "Interactive video cutout," ACM SIGGRAPH, 2005), each of which is incorporated here by reference.

In general, for rotoscoping, the user defines a contour of a visual object in key frames, and the system automatically tracks the contour in on or more of the remaining frames. The user can correct the errors in the tracking, and the system is able of propagating the corrections effectively. In scribbling, the user defines a trimap in key frames, which consists of three labels, definite foreground, definite background and unknown areas. Both rotoscoping and scribbling require a significant amount of user input and typically are used in simple scenarios with a single moving foreground and a static (moving) background. By interacting with the GUI 106, the user is requested to draw a shape around visual objects of interest instead of drawing a contour or manually labeling all pixels.

Minimizing the Objective Function

One or more techniques can be implemented to minimize the objective function. For example, a belief propagation technique can be utilized, which is considered to be a powerful tool for Bayesian MAP (maximum a posteriori) inference in a graphical model. When used to segment the visual objects in the video sequence, each node in the graphical model, or a 3D Markov random field, is a binary variable indicating whether each pixel in the video belongs to foreground or background. The energy of the graphical model contains spatial priors, color likelihood, and image-dependent smoothness terms. In belief propagation, when messages are passed from one pixel to its neighbors in space and time, the local evidence of a pixel belonging to foreground or background is propagated, and thus a local (but satisfactory) minimum of the objective function is achieved through belief propagation.

The computation time for a belief propagation operations increases as $O(kn^2T)$, in which k is the number of nodes, n is the size of the hidden variable space, and T is the number of iterations. This quadratic increase in time with respect to the size of the hidden variable space can hinder the feasibility of using BP in large hidden variable spaces (e.g., video sequences). Thus, more efficient and robust approaches are required, such as a bipartite belief propagation, which is described, for example, by Felzenszwalb, P. and Huttenlocher, D., in "Efficient Belief Propagation for Early Vision. International Journal of Computer Vision," Vol 70, Issue 1, October 2006, the contents of which is incorporated here by reference in its entirety.

Typically, in a video, every pixel, which can be considered as a 3D vector in RGB space, can be represented as I(x, y, t), or as I(z) in which z=(x, y, t) is used as a space-time index. The value of a binary variable w(z) for each pixel classifies the pixels as being part of the foreground (w(z)=1) or the background (w(z)=0).

Let the mean and covariance of the background pixel be m(z) and Cov(z), respectively. The probability that pixel I(z) belongs to the background can be calculated as $$P_b(z) = \frac{N(I(z); m(z), \text{Cov}(z))}{N(I(z); m(z), \text{Cov}(z)) + \varepsilon}, \quad (1)$$

in which N( . . . ) is multi-variant Gaussian probability density function (pdf). By spatially smoothing the probability, the background prior can be obtained $$P_b^*(x,y,t) = P_b(x,y,t)^* g(x,y), \quad (2)$$

in which g(x,y) is a Gaussian filter.

A color histogram $h_f(I(z))$ can be calculated for the foreground pixels, and $h_b(I(z))$ for background. A color histogram maps a 3D vector in RGB space to a frequency count (scalar).

Smoothness or "regularization" terms can be added to make the assignment of neighboring pixels (both in space and time) similar. A weight of the assignment similarity can depend on the color similarity of the pixels. Let C denote the set of pairs of neighboring pixels. The smoothness between two neighboring pixels z and p can be defined as $$[w(z) \neq w(p)] \left( \frac{\varepsilon + e^{-\mu \|I(z) - I(p)\|^2}}{1 + \varepsilon} \right), \quad (3)$$

in which $\mu = (2 < \|I(z) - I(p)\|^2 >)^{-1}$, and "<.>" denotes an average over all pairs of neighbors in the video sequence.

An assignment of pixels is sought that minimizes the following objective function:

$$w^* = \text{argmin}_w \sum_z ((1 - P_b^*(z))w(z) + P_b^*(z)(1 - w(z))) + \quad (4)$$

$$\alpha \sum_z ((h_f(I(z))w(z) + h_b I(z))(1 - w(z))) +$$

$$\beta \sum_{(z,p) \in C} [w(z) \neq w(p)] \left( \frac{\varepsilon + e^{-\mu \|I(z) - I(p)\|^2}}{1 + \varepsilon} \right).$$

Alpha and beta are weights that can be equal or can be varied independently. Alpha and beta can have values, for example, ranging from 0 to 50 or higher (e.g., 0.2 and 0.5, 0.5 and 1, 1 and 1, 2 and 1, 5 and 10).

Applications of Visual Processing

Figure 5:
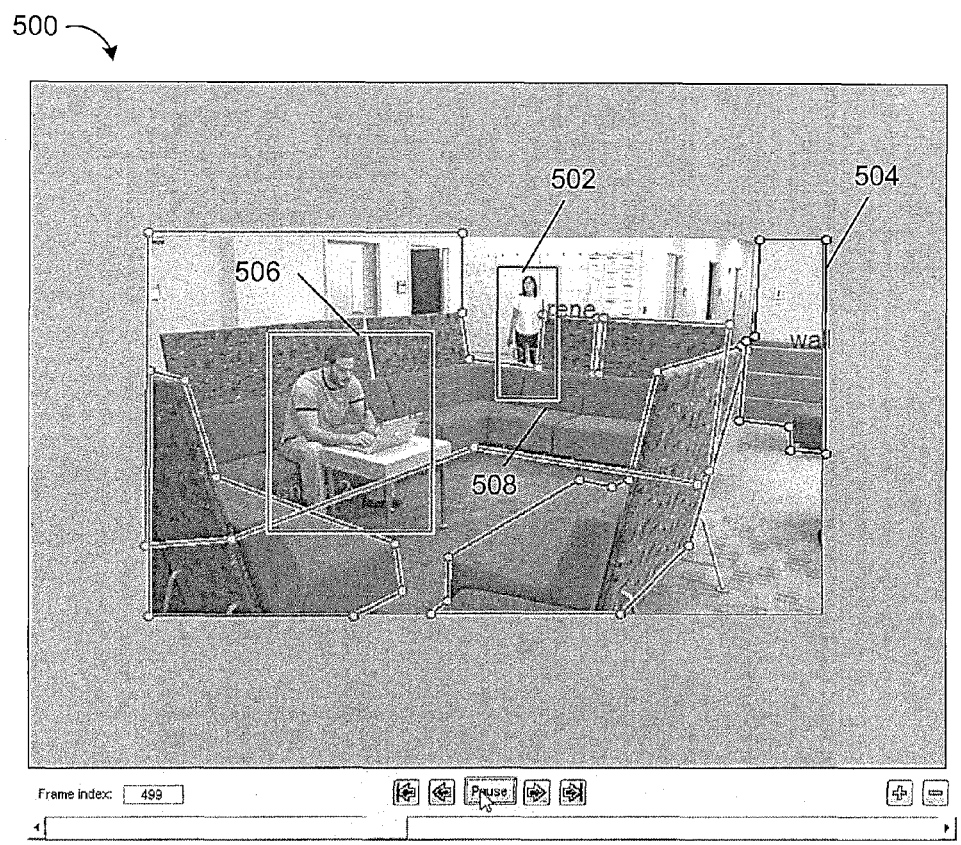

The visual processing performed by the visual manager 112 permit complicated scenarios to be analyzed effectively and efficiently. For example, referring to FIG. 5, a graphical user interface 500 shows that multiple objects (e.g., Irene 502, wall 504, Kevin 506, and chair 508) can be identified. Alternatively or in addition, object occlusion can be addressed: even though Irene 502 is partially occluded by the chair 508, the part of her that is not visible can still be identified in later frames. Alternatively or in addition, the background can be dynamic (e.g., pixels that are labeled as "background" in one frame can be labeled as "not background" in other frames).

Figure 6:
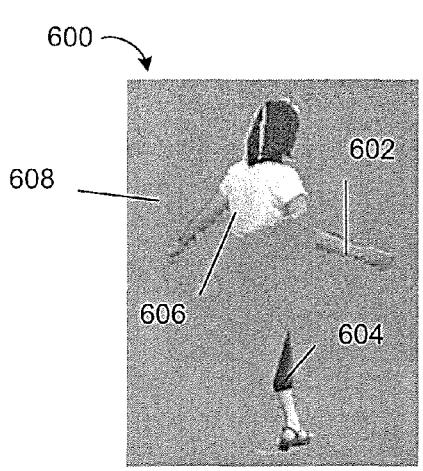
FIGS. 6 and 7 are representations of a video content segmentation.
Figure 7:
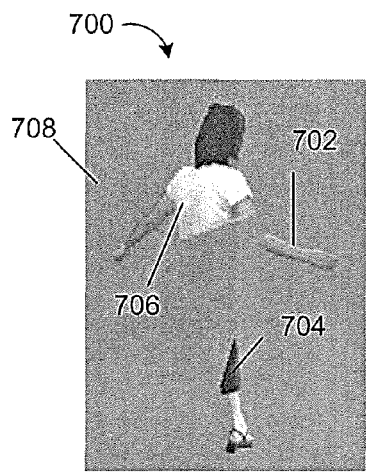
Figure 16:
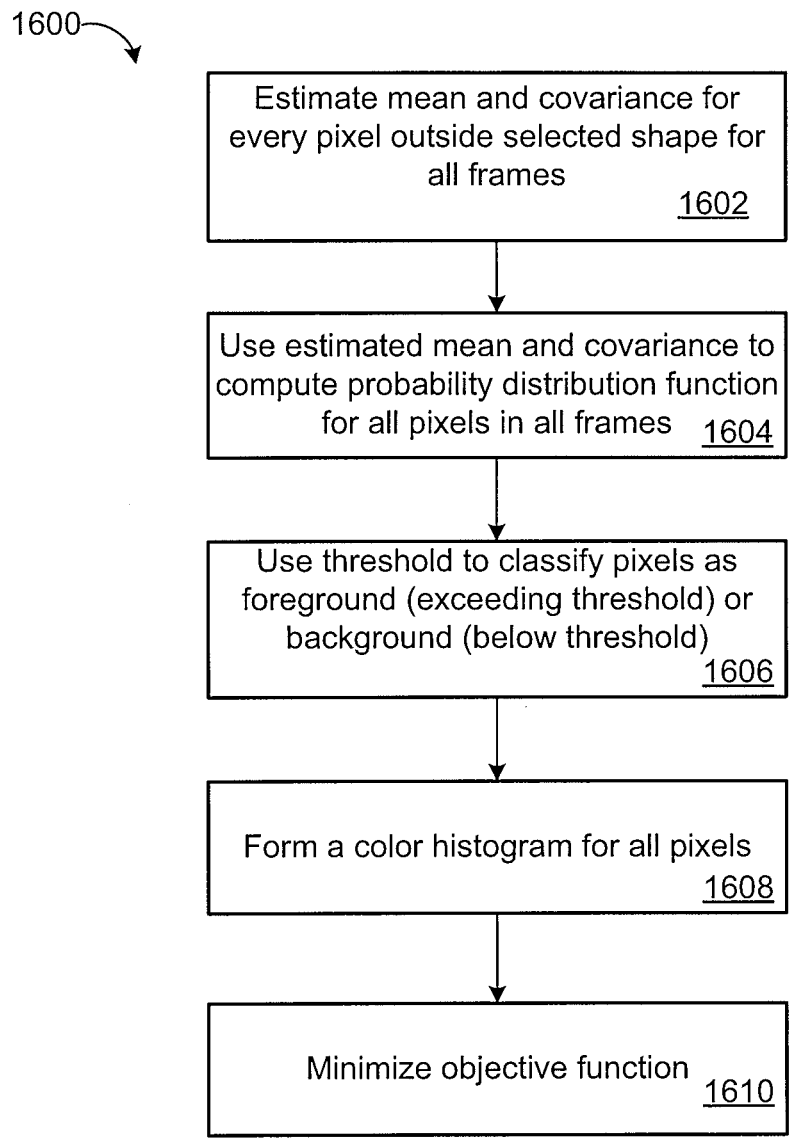
FIG. 16 is a flow chart that represents exemplary operations of a visual manager.

The described visual processing provides a segmentation of objects with minimal user input and can be provided by the operations of the visual manager 112 (e.g., as represented in flowchart 1600 in FIG. 16). For example, referring to FIG. 6, a segmentation 600 (e.g., a grouping of pixels into objects) is produced after classifying the pixels into a foreground (which includes visual objects 602, 604, and 606) and a background 608. The segmentation 600 is a rough estimate of the visual objects but is not ideal, as the visual objects have enlarged borders (e.g., visual object 604) or streaks (e.g., visual object 606). Referring to FIG. 7, a segmentation 700 is shown that is the result of performing segmentation after the color histogram has been formed and the objective function has been minimized. The segmentation 700 is cleaner and more accurate than the segmentation 600 and visual objects 702, 704, and 706 do not have enlarged borders or streaks.

Audio Processing

One or more techniques and methodologies may be implemented by the audio manager 114 to extract from the audio stream distinct audio objects. For example, techniques may be utilized based on the methods described by Smaragdis, P., et al., in "Supervised and Semi-Supervised Separation of Sounds from Single-Channel Mixtures," in the proceedings of the 7th International Conference on Independent Component Analysis and Signal Separation. London, UK. September 2007, which is incorporated here by reference in its entirety.

Figure 17:
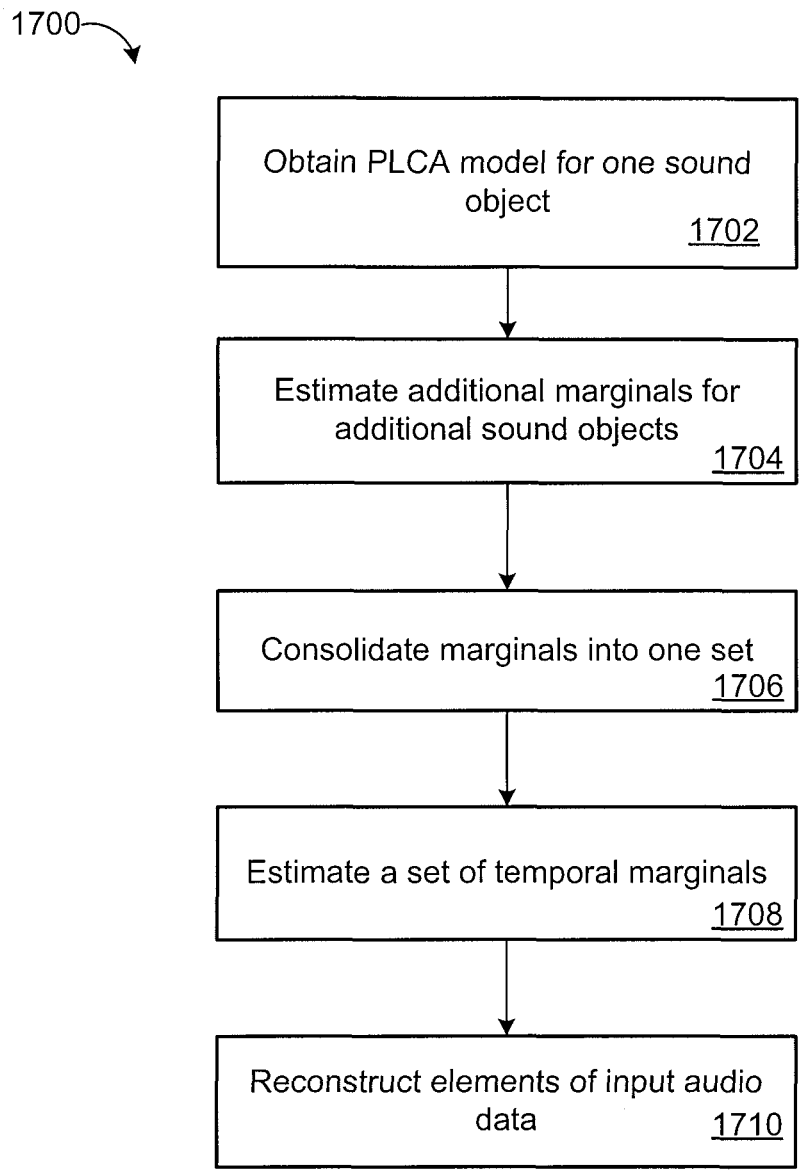
FIG. 17 is a flow chart that represents exemplary operations of an audio manager.

In one arrangement, the audio manager 114 may perform an audio processing technique that is represented in flowchart 1700 of FIG. 17. A Probabilistic Latent Component Analysis (PLCA) model is obtained for each sound object that is present in the video sequence. The basic model is defined as $$P(x) = \sum_z P(z) \prod_{j=1}^{N} P(x^{(j)} | z) \qquad (5)$$

in which P(x) is a time-frequency distribution of the sound one needs to model. This is over the N-dimensional random variable x and $x^{(j)}$ denotes the $j^{th}$ dimension (in this case j=1 is time and j=2 is frequency). The random variable z can be a latent variable, and the $P(x^{(j)}|z)$ are one-dimensional distributions. Effectively, this model can represent a mixture of marginal distribution products to approximate an N-dimensional distribution. The objective of this approach is to discover the most appropriate marginal distributions that approximate the input. The estimation of the marginals $P(x^{(j)}|z)$ can be performed, for example, by using the expectation-maximization (EM) algorithm. In the expectation step, the posterior probability of the latent variable z can be estimated as $$P(z|x) = \frac{P(z) \prod_{j=1}^{N} P(x^{(j)} | z)}{\sum_{z'} P(z') \prod_{j=1}^{N} P(x^{(j)} | z')} \qquad (6)$$

and, in a maximization step, the marginals are re-estimated using the above weighting to obtain a new and more accurate estimate $$P(z) = \int P(x) P(z|x) dx \qquad (7)$$

$$P^*(x^{(j)}|z) = \int \ldots \int P(x) P(z|x) dx^{(k)}, \forall k \neq j \qquad (8)$$

$$P(x^{(j)}|z) = \frac{P^*(x^{(j)}|z)}{P(z)}. \qquad (9)$$

Repeating the above steps in an alternating manner multiple times can produce a converging solution for the marginals $P(x^{(j)}|z)$ along each dimension j, and the latent variable priors P(z). In the case in which P(x) is discrete, the integrations can be replaced by summations. Likewise the latent variable z can be continuous-valued, in which case the summations over z become integrals. In practical applications, P(x) and z will both be discrete, which is assumed for most audio processing.

Once an audio model is constructed for each sound in the mixture, one can easily reconstruct only the audio elements relating to one sound source, by only using its marginals to approximate the input.

Graphical User Interface for Audio Objects

Figure 8:
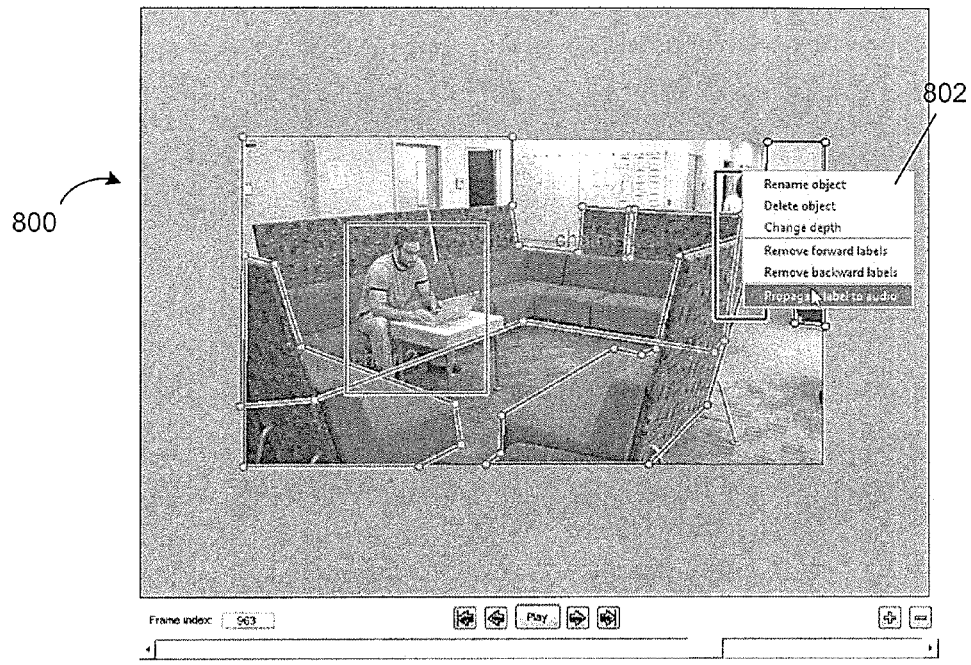

Referring to FIG. 8, after shapes (e.g., shapes 208, 302, 402 of FIGS. 2, 3, and 4, respectively) have been produced that surround a visual object (e.g., object 210) for the entire video sequence, a label that is associated with a specific visual object can be optionally transferred to an audio graphical user interface 800. A menu 802 can be accessed from the visual graphical user interface 800, and a "propagate label to audio" option can be selected. Other options in the menu 802 can include, e.g., "rename object," "delete object," "change depth," "remove forward labels," and "remove backward labels."

Figure 9:
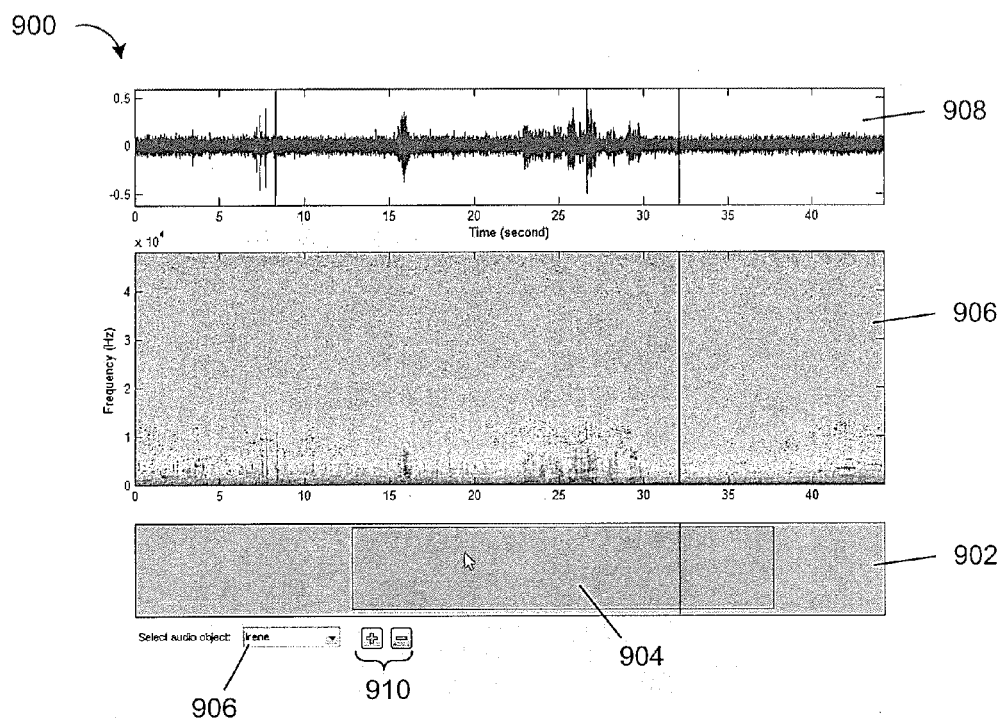
FIGS. 9-11 are representations of an audio graphical user interface.

Referring to FIG. 9, an audio GUI 900 that may be included in the GUI 106. After the "propagate label to audio" menu option is selected, an audio label 801 is created in an area 902 of the audio GUI 900. A name (e.g., "Irene") of the audio label 904 can be selected in menu 906. The audio label 904 corresponds to a temporal window that can be adjusted by the user. For example, the user can lengthen the sides of the audio label 904, thus expanding the temporal window. The window of the audio label 904 selects the time window of an audio spectrogram 906 and an audio magnitude graph 908. The user can add or delete additional labels by selecting buttons 910.

Figure 10:
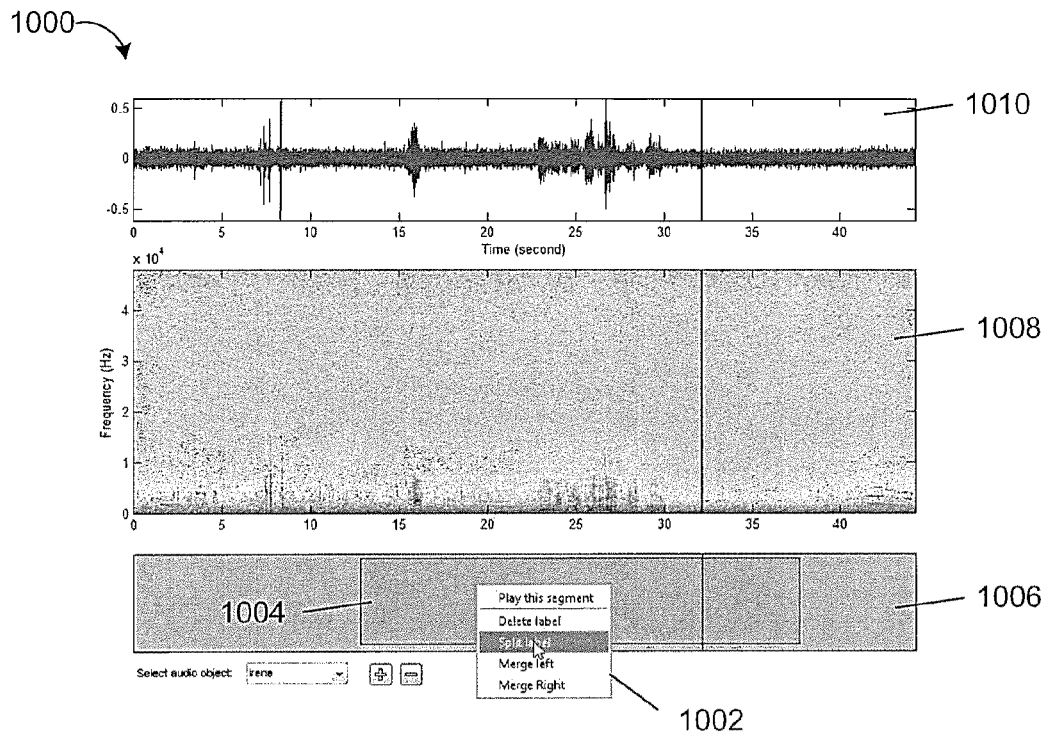
Figure 11:
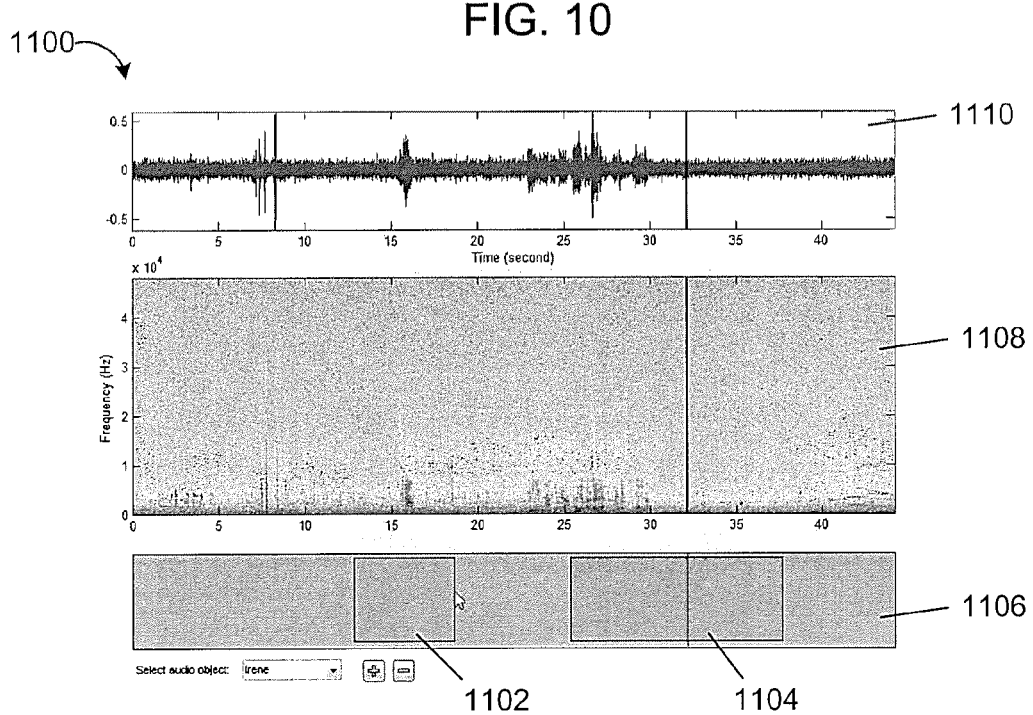

Referring to FIG. 10, a menu 1002 can be accessed in the audio GUI 1000. Options on the menu 1002 can include, e.g., "play this segment," "delete label," "split label," "merge left," and "merge right." If "split label" is selected by a user, the audio label 1004 shown in FIGS. 9 and 10 splits into audio label 1102 and audio label 1104, as shown in FIG. 11. Both audio label 1102 and audio label 1104 are still associated with the visual object (Irene 502 in FIG. 5) that was transferred from the video GUI to the audio GUI. A user can edit the length of both audio label 1102 and audio label 1104 by clicking with a cursor on the edge of the label and dragging to the left or to the right.

Combining Audio and Visual Processing

The operations provided by the visual manager 112 and the audio manger 114 may be combined by the linking manager 116 in one or more applications, such as digital video editing. For example, the linking manager can match a unique soundtrack to each visual object in a video. Operations of the linking manager 116 can adjust the soundtrack for each visual object so that it can be adjusted or muted independently of the other visual objects. For example, both the audio and visual information for a visual object can be removed. Alternatively or in addition, pixels of a visual object as well as the associated soundtrack can be replicated and adjusted. For example, one singer can be replicated and frequency- or time-shifted to create a concert.

Figure 13:
FIG. 13 is a video image that has been re-rendered using combined visual and audio information.
Figure 12:
FIG. 12 is an original video image.

Alternatively or in addition, the linking manager 116 can alter a visual appearance of a visual object in a fashion that depends on the visual object's soundtrack. Referring to FIG. 12, an object 1200 originally has a height 1202 during a given frame. The linking manager 116 associates the object 1200 with a sound track that can be used to exaggerate motion or other visual characteristics based on the loudness or frequency of the sound. Referring to FIG. 13, the object 1300 (a modified version of object 1200 in FIG. 12) now has a height 1302 that is greater than the original height 1202 in the same video frame because, for example, the sound produced by the object 1300 reached a maximum during this frame.

Figure 14:
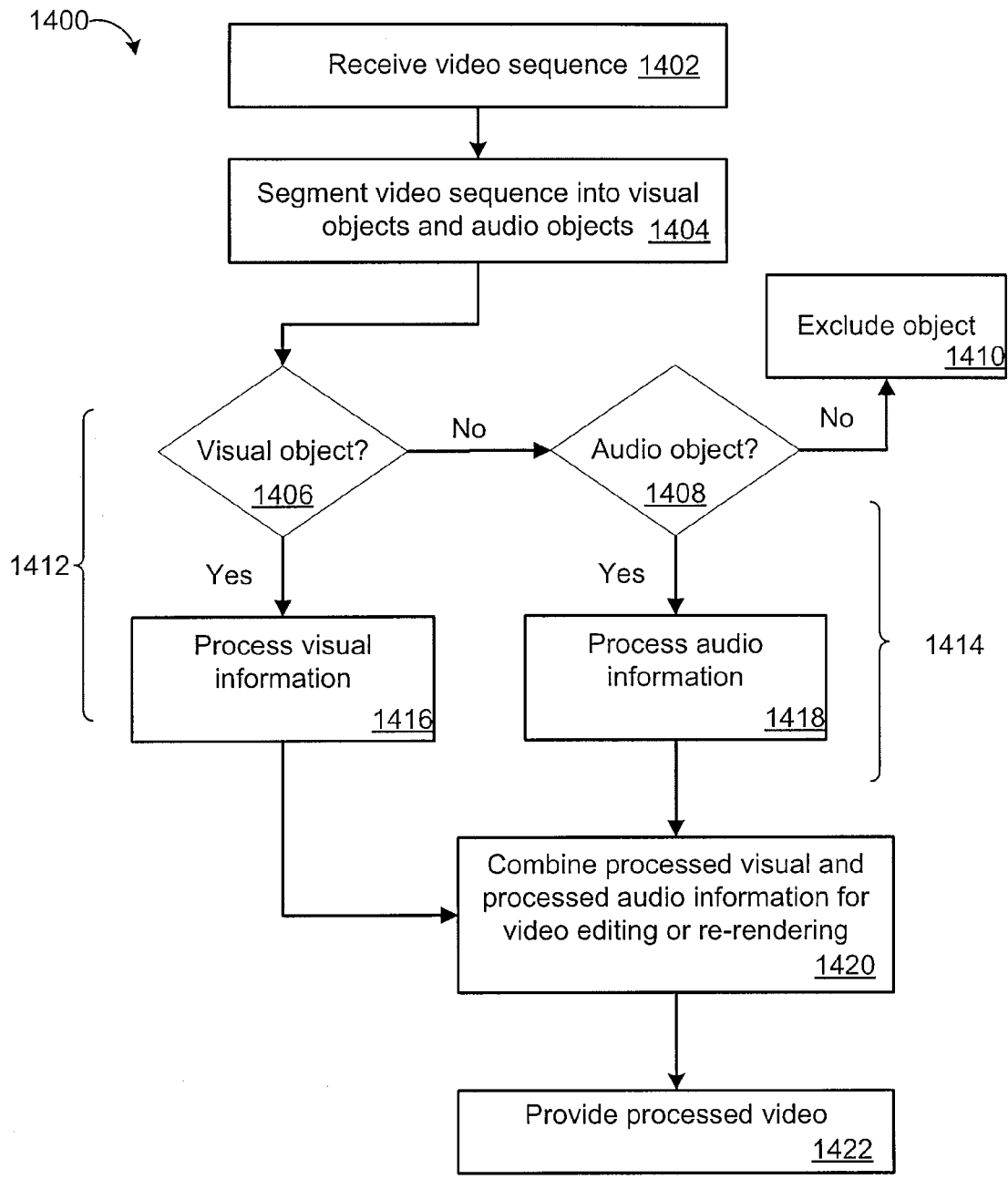
FIG. 14 is a flow chart that represents exemplary operations of an editing process performed on a video sequence.

Example systems and techniques for combining visual and audio processing are described herein. Referring to FIG. 14, a flow chart 1400 represents some operations of an editing process that can be provided, for example, by the visual manager 112, the audio manager 114, and the linking manager 116 for a video sequence (e.g., the video sequence 100). A video sequence is received (1402) and is segmented (1404) into visual objects and audio objects. For example, the video sequence can be segmented into visual objects 104 (e.g., groups of pixels) and audio objects 102 (e.g., sound tracks). Operations also include determining (1406) whether or not an object is a visual object. If it is not a visual object, another decision (1408) is made whether or not the object is an audio object. If the object is neither a visual object nor an audio object, it is excluded (1410) from further processing.

If the object is a visual object, operations associated with a visual processing path 1412 are executed, which include editing and processing (1416) the visual information (e.g., interpolating a position of the visual object 102 between user-identified key frames, segmenting pixels into groups, calculating pixel statistics, regrouping pixels based on calculations). If the object is determined (1408) to be an audio object, operations associated with an audio processing path 205 are executed, which include editing and processing (1418) the audio information (e.g., segmenting the audio information into channels). Although the visual objects 104 are processed independently from the audio objects 102, both processing paths 1412 and 1414 can be combined (1420) in which a quality of the visual object 104 can be used to influence the audio processing 1414, a quality of the audio object 102 can be used to influence the visual processing 1412, or both. In such a manner, the systems and methods provide (1422) a processed video that can be rendered using information about both the audio objects 102 and the visual objects 104 and enhance editing of the video sequence 100.

Figure 15:
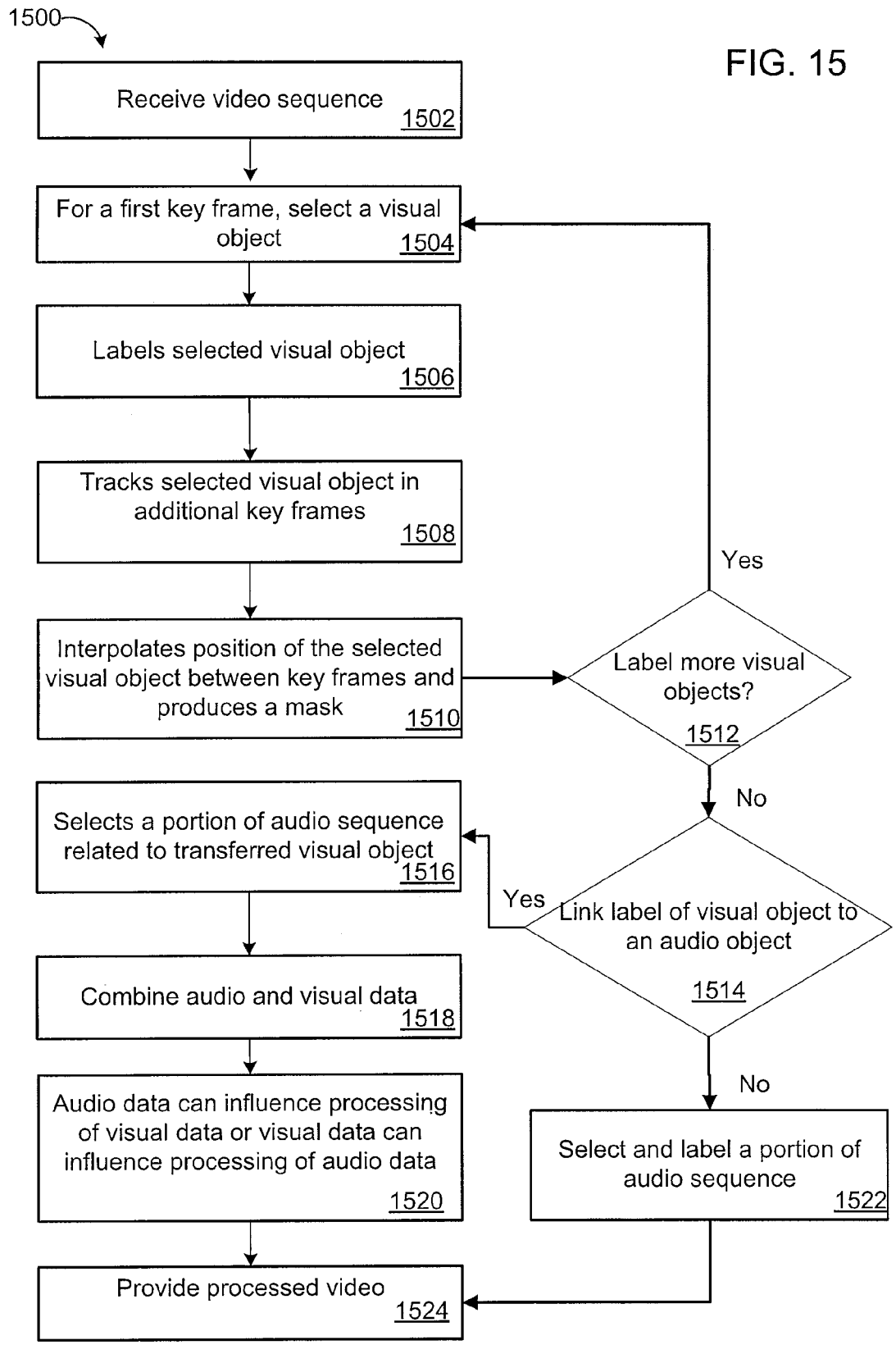
FIG. 15 is a flow chart that represents a technique for processing visual and audio components of video sequences.

Referring to FIG. 15, a flow chart 1500 illustrates operations for editing a video sequence that can be provided, for example, by the visual manager 112, the audio manager 114, and the linking manager 116. Operations can include, for example, receiving (1502) a video sequence. In some examples, a user may initiate receiving the video sequence by using a GUI (e.g., GUI 106) that is presented on a computer system (e.g., computer 108). For a first key frame, or a frame of the video sequence 100 that is of interest to a user, of the received video sequence (e.g., video sequence 100), the user selects (1504) a visual object (e.g., a person or other entity present in the video) and labels (1506) the selected visual object. For example, the user can place a shape (e.g., a circle or a square) around the boundary of a visual object. The user tracks (1508) the selected visual object in additional key frames, e.g., by finding the visual object in one or more additional frames and adjusting the boundary so that it continues to surround the visual object of interest from frame to frame.

The number of key frames chosen will depend on properties (e.g., acceleration, contrast) of the visual object of interest. For example, if the visual object is changing directions or speed, such as a car in a car chase or an athlete in a sporting event, more key frames would be needed to accurately track the visual object than if it is moving slowly, such as a person walking leisurely or a balloon rising. In some arrangements, between 10 and 100 (e.g., 10, 20, 50, 75) key frames may be defined and used.

As part of the visual processing stream (e.g., the visual processing stream 1412 that can be implemented on the visual manager 116), the position of the selected visual object may be interpolated between key frames and a mask for the selected visual object is produced (1510). If the user wishes to identify additional visual objects in the video sequence (1512), she can select (1504), label (1506), and track (1508) additional visual objects, and additional masks will be produced (1510).

Upon the visual objects being identified, operations include determining whether to transfer (1512) a label for a selected and labeled visual object to an audio GUI (e.g., part of the GUI 106 managed by the audio manager 114). This transferring can be performed by the linking manager 116. The user can select (1516) a portion of an audio sequence, for example, by editing temporal boundaries of a shape that identifies various portions of a graphical representation (e.g., a spectrogram, time domain graph of the audio information). In this manner, the identified portions of the audio information is linked with the visual object. The audio information associated with the selected portion of the audio sequence can be combined (1518) with the visual data associated with the selected visual object. For any linked audio object and video object, audio data can influence (1520) processing of the combined visual data. Alternatively or in addition, visual data can influence (1520) processing of the combined audio data. A processed video sequence can then be provided (1524) (e.g., rendered on a display of the computer 108, played on speakers).

In some examples, a video sequence can be rendered with special effects (e.g., the size of a visual object can be adjusted by an amount that is proportional to the amplitude of a linked audio object). The techniques in flowchart 1500 permit the user to effectively select both visual and audio objects using the GUI 106, link these objects and jointly process them.

If the user does not choose to transfer (1514) a label for a selected and labeled visual object to an audio GUI, she can select and label (1522) a portion of an audio sequence. A processed video sequence can then be provided (1524).

Although the steps in flowchart 1500 are presented in one order, some steps can be omitted or can be performed in different orders.

Referring to FIG. 16, an example flowchart 1600 provides another arrangement of operations that may be executed by the visual manager 112. These steps may be performed after a user selects (e.g., step 1504 in FIG. 15) a visual object (e.g., by drawing a shape around the visual object).

A mean and covariance are estimated 1602 for every pixel outside the shape for all frames of the video sequence 100. The estimated mean and covariance are used 1604 to compute a probability distribution function for all pixels in all frames. Pixels are classified 1606 by using a predefined threshold (e.g., 0.001, 0.0001, 0.01) to identify a pixel as belonging to the foreground (e.g., exceeding the threshold) or background (e.g., below the threshold). This classification can be used as an initial estimate of object segmentation. A color histogram is formed 1608 (e.g., using at least one of a red, green, and blue channel) for all pixels. A color histogram is formed for the pixels classified as foreground pixels and a separate color histogram is formed for the pixels classified as background pixels. For each channel, the corresponding histogram may be defined to includes a variety of bins (e.g., 10, 20, 25, 30, 50, 75).

An objective function is minimized 1610 to complete a segmentation of visual objects. The objective function typically combines terms that can use any or all of the following: 1) background estimation or spatial priors (e.g., as obtained from a spatially-smoothed the pixel classification 1606), color modeling (e.g., as obtained from the formed color histogram 1608), spatial consistency (e.g., conditions imposed on pixels that are neighbors within a frame), and temporal consistency (e.g., conditions imposed on pixels that are neighbors between frames) to extract the detailed mask of a moving object inside the created shape.

Referring to FIG. 17, an example flowchart 1700 provides operations that may be executed by the audio manager 114. Operations include obtaining (1702) a Probabilistic Latent Component Analysis (PLCA) model for one sound object that is present in the video sequence. Additional marginals can be estimated 1704 for additional sound objects and can be consolidated (1706) into one set. A set of temporal marginals can be estimated (1708), and elements of the input audio data can be reconstructed (1710).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A computer-implemented method comprising:
   segmenting a plurality of video frames of a sequence of video frames into a first portion that includes a selected visual object represented in the video frame and a second portion that includes a background represented in the video frame, the selected visual object being selected by using a selection envelope and the background represented in the second portion being determined from one or more quantities calculated from pixels external from the selection envelope and absent pixels in the selection envelope;
   tracking the selected visual object through a plurality frames of the sequence of video frames by interpolating the position of the selected visual object between user-defined video frames;
   estimating a mean and a covariance of at least one pixel that is identified as being absent from the first portion that includes the selected visual object;
   computing a probability distribution from the estimated mean and covariance;
   applying a threshold to each pixel associated with the probability distribution and classifying the pixel as foreground or background; and
   forming a first color histogram for foreground pixels and a second color histogram for background pixels.

2. The computer-implemented method of claim 1, further comprising:
   adding a third portion that corresponds to an additional selected visual object.

3. The computer-implemented method of claim 1, further comprising:
   editing pixels identified as part of the first portion that includes the selected visual object.

4. The computer-implemented method of claim 1, further comprising:
   minimizing an objective function.

5. The computer-implemented method of claim 4, wherein the objective function comprises at least one of a spatial prior term, a color likelihood term, and a continuity term.

6. A computer-implemented method comprising:
   segmenting a plurality of video frames of a sequence of video frames into a first portion that includes a selected visual object represented in the video frame and a second portion that includes a background represented in the video frame, the selected visual object being selected by being within a selection envelope and the background represented in the second portion being determined from one or more quantities calculated from pixels external from the selection envelope and absent pixels in the selection envelope;
   estimating a mean and a covariance of at least one pixel that is identified as being absent from the first portion that includes the selected visual object;
   computing a probability distribution from the estimated mean and covariance;
   applying a threshold to each pixel associated with the probability distribution and classifying the pixel as foreground or background; and
   linking the first portion that includes a selected visual object with an audio object selected from the sequence of video frames.

7. The computer-implemented method of claim 6, further comprising:
   adding a third portion that corresponds to an additional selected visual object; and
   linking the third portion with an additional audio object.

8. The computer-implemented method of claim 6, further comprising:
   editing pixels identified as part of the first portion that includes the selected visual object.

9. The computer-implemented method of claim 6, further comprising:
   separating audio information into a plurality of channels.

10. The computer-implemented method of claim 6, further comprising:
    forming a first color histogram for foreground pixels and a second color histogram for background pixels; and
    minimizing an objective function.

11. The computer-implemented method of claim 6, further comprising:
    editing a property of the selected visual object based on the linked audio object.

12. The computer-implemented method of claim 11, wherein the property of the selected visual object comprises at least one of size, color, motion, or number.

13. The computer-implemented method of claim 11, further comprising:
    editing a property of the audio object based on the linked first visual object.

14. The computer-implemented method of claim 11, wherein a property of the audio object comprises at least one of volume, frequency, or timing.

15. The computer-implemented method of claim 11, further comprising:
editing the video sequence to remove the first portion that includes a selected visual object of interest and the linked audio object.

16. The computer-implemented method of claim 6, further comprising responsive to the linking, exaggerating motion associated with the selected visual object from one video frame to another video frame of the sequence of video frames.

17. A system comprising:
a computing device comprising a video manager configured to:
segment a plurality of video frames of a sequence of video frames into a first portion that includes a selected visual object represented in the video frame and a second portion that includes a background represented in the video frame, the selected visual object being selected by using a selection envelope and the background represented in the second portion being determined from one or more quantities calculated from pixels external from the selection envelope and absent pixels in the selection envelope;
estimate a mean and a covariance of at least one pixel that is identified as being absent from the first portion that includes the selected visual object;
compute a probability distribution from the estimated mean and covariance;
apply a threshold to each pixel associated with the probability distribution and classifying the pixel as foreground or background; and
link the first portion that includes the selected visual object with an audio object selected from the sequence of video frames.

18. The system of claim 17, wherein the video manager is further configured to add a third portion that corresponds to an additional selected visual object.

19. The system of claim 17, wherein the video manager is further configured to edit pixels identified as part of the first portion that includes the selected visual object.

20. The system of claim 17, wherein the video manager is further configured to:
form a first color histogram for foreground pixels and a second color histogram for background pixels; and
minimize an objective function.

21. The system of claim 20, wherein the objective function comprises at least one of a spatial prior term, a color likelihood term, and a continuity term.

22. A system comprising:
a computing device comprising:
a video manager configured to segment a plurality of video frames of a sequence of video frames into a first portion that includes a selected visual object represented in the video frame and a second portion that includes a background represented in the video frame, the selected visual object being selected by using a selection envelope and the background represented in the second portion being determined from one or more quantities calculated from pixels external from the selection envelope and absent pixels in the selection envelope; and
a linking manager configured to:
link the first portion that includes a selected visual object to a selected audio object; and
adjust the selected audio object for the selected visual object independently of other visual objects in the sequence of video frames; and
the video manager being further configured to edit a property of the first visual object based on the linked audio object.

23. The system of claim 22, wherein the video manager is further configured to add a third portion that corresponds to an additional selected visual object; and the linking manager is configured to link the third portion with an additional audio object.

24. The system of claim 22, wherein the video manager is further configured to edit pixels identified as part of the first portion that includes the selected visual object.

25. The system of claim 22, wherein the computing device comprises an audio manager configured to separate the selected audio object in the video sequence into a plurality of channels.

26. The system of claim 22, wherein the video manager is further configured to:
estimate a mean and a covariance for a plurality pixels that are excluded from a shape;
compute a probability distribution for a plurality pixels having an estimated mean and covariance;
apply a threshold to each pixel associated with the probability distribution and classifying the pixel as foreground or background;
form a first color histogram for foreground pixels and a second color histogram for background pixels; and
minimize an objective function.

27. The system of claim 22, wherein the property of the first visual object comprises at least one of size, color, motion, or number.

28. The system of claim 22, wherein the video manager is further configured to edit a property of the selected audio object based on the linked first visual object.

29. The system of claim 22, wherein a property of the selected audio object comprises at least one of volume, frequency, or timing.

30. The system of claim 22, wherein the video manager is further configured to edit the video sequence to remove the first portion that includes a first visual object of interest and the linked audio object.

31. One or more computer readable storage memories encoded with computer-executable instructions that, responsive to execution, configure a computer system to perform operations comprising:
segmenting a plurality of video frames of a sequence of video frames into a first portion that includes a selected visual object represented in the video frame and a second portion that includes a background represented in the video frame, the selected visual object being selected using a selection envelope and the background represented in the second portion being determined from one or more quantities calculated from pixels external from the selection envelope and absent pixels in the selection envelope;
computing a probability distribution of at least one pixel that is identified as being absent from the first portion that includes the selected visual object;
applying a threshold to each pixel associated with the probability distribution and classifying the pixel as foreground or background; and
matching audio data to the selected visual object in each frame of the sequence of video frames.

32. The one or more computer readable storage memories of claim 31, further operable to cause data processing apparatus to perform operations comprising:
adding a third portion that corresponds to an additional selected visual object.

33. The one or more computer readable storage memories of claim 31, further operable to cause data processing apparatus to perform operations comprising:
editing pixels segmented as part of the selected visual object.

34. The one or more computer readable storage memories of claim 31, further operable to cause data processing apparatus to perform operations comprising:
estimating a mean and a covariance of at least one pixel that is identified as being absent from the first portion that includes the selected visual object;
forming a first color histogram for foreground pixels and a second color histogram for background pixels; and
minimizing an objective function.

35. The one or more computer readable storage memories of claim 34, wherein the objective function comprises at least one of a spatial prior term, a color likelihood term, and a continuity term.

36. One or more computer readable storage memories encoded with computer-executable instructions that, responsive to execution, configure a computer system to perform operations comprising:
segmenting a plurality of video frames of a sequence of video frames into a first portion that includes a selected visual object represented in the video frame and a second portion that includes a background represented in the video frame, the selected visual object being selected using a selection envelope and the background represented in the second portion being determined from one or more quantities calculated from pixels external from the selection envelope and absent pixels in the selection envelope;
linking the first portion that includes the selected visual object represented in the video frame with an audio object; and
applying the audio object linked with the first portion that includes the selected visual object represented in the video frame to other video frames that include the selected visual object; and
editing a property of the audio object based on the linked visual object.

37. The one or more computer readable storage memories of claim 36, the operations further comprising:
adding a third portion that corresponds to an additional selected visual object; and
linking the third portion with an additional audio object.

38. The one or more computer readable storage memories of claim 36, the operations further comprising:
editing pixels identified as part of the first portion that includes the selected visual object.

39. The one or more computer readable storage memories of claim 36, the operations further comprising:
separating audio information into a plurality of channels.

40. The one or more computer readable storage memories of claim 36, the operations further comprising:
estimating a mean and a covariance of at least one pixel that is identified as being absent from the first portion that includes the selected visual object;
computing a probability distribution from the estimated mean and covariance;
applying a threshold to each pixel associated with the probability distribution and classifying the pixel as foreground or background;
forming a first color histogram for foreground pixels and a second color histogram for background pixels; and
minimizing an objective function.

41. The one or more computer readable storage memories of claim 36, the operations further comprising:
editing a property of the selected visual object based on the linked audio object.

42. The one or more computer readable storage memories of claim 41, wherein the property of the selected visual object comprises at least one of size, color, motion, or number.

43. The one or more computer readable storage memories of claim 41, wherein a property of the audio object comprises at least one of volume, frequency, or timing.

44. The one or more computer readable storage memories of claim 41, the operations further comprising:
editing the video sequence to remove the first portion that includes a selected visual object of interest and the linked audio object.

45. A method comprising:
executing instructions on a specific apparatus so that binary digital electronic signals representing a plurality of video frames of a sequence of video frames are segmented into binary digital electronic signals representing a first portion that includes a selected visual object represented in the video frame and a second portion that includes a background represented in the video frame, the selected visual object being selected by using a selection envelope and the background represented in the second portion being determined from one or more quantities calculated from pixels external from the selection envelope and absent pixels in the selection envelope;
estimating a mean and a covariance of at least one pixel that is identified as being absent from the first portion that includes the selected visual object;
computing a probability distribution from the estimated mean and covariance;
applying a threshold to each pixel associated with the probability distribution and classifying the pixel as foreground or background; and
exaggerating motion associated with the selected visual object from one video frame to another video frame of the sequence of video frames based on applying an audio object linked with the selected visual object.

46. The method of claim 45, further comprising storing the resulting binary digital electronic signals representing the first portion and the second portion in memory of the specific apparatus.

* * * * *